US011948555B2

(12) United States Patent
Christie et al.

(10) Patent No.: US 11,948,555 B2
(45) Date of Patent: Apr. 2, 2024

(54) METHOD AND SYSTEM FOR CONTENT INTERNATIONALIZATION AND LOCALIZATION

(71) Applicant: Piksel, Inc., Atlanta, GA (US)

(72) Inventors: Mark Christie, Auckley (GB); Gerald Chao, Los Angeles, CA (US)

(73) Assignee: NEP SUPERSHOOTERS L.P., Pittsburgh, PA (US)

( * ) Notice: Subject to any disclaimer, the term of this patent is extended or adjusted under 35 U.S.C. 154(b) by 380 days.

(21) Appl. No.: 17/441,220

(22) PCT Filed: Mar. 20, 2020

(86) PCT No.: PCT/EP2020/057843
§ 371 (c)(1),
(2) Date: Sep. 20, 2021

(87) PCT Pub. No.: WO2020/188101
PCT Pub. Date: Sep. 24, 2020

(65) Prior Publication Data
US 2022/0172709 A1    Jun. 2, 2022

Related U.S. Application Data

(60) Provisional application No. 62/821,274, filed on Mar. 20, 2019.

(51) Int. Cl.
*G10L 15/00* (2013.01)
*G10L 15/06* (2013.01)
(Continued)

(52) U.S. Cl.
CPC ............ *G10L 15/07* (2013.01); *G10L 15/005* (2013.01); *G10L 15/063* (2013.01);
(Continued)

(58) Field of Classification Search
None
See application file for complete search history.

(56) References Cited

U.S. PATENT DOCUMENTS 9,324,340 B2 * 4/2016 McCoy .................... G10L 21/10
9,571,870 B1 * 2/2017 Wilson .................. G10L 15/005
(Continued)

FOREIGN PATENT DOCUMENTS

WO    2007103520 A1    7/2002

OTHER PUBLICATIONS

International Search Report and Written Opinion issued by the European Patent Office for PCT Application PCT/EP2020/057843, dated Jun. 30, 2020.

*Primary Examiner* — Satwant K Singh
(74) *Attorney, Agent, or Firm* — HOLZER PATEL DRENNAN (57) ABSTRACT

A method of processing a video file to generate a modified video file, the modified video file including a translated audio content of the video file, the method comprising: receiving the video file; accessing a facial model or a speech model for a specific speaker, wherein the facial model maps speech to facial expressions, and the speech model maps text to speech; receiving a reference content for the originating video file for the specific speaker; generating modified audio content for the specific speaker and/or modified facial expression for the specific speaker; and modifying the video file in accordance with the modified content and/or the modified expression to generate the modified video file.

20 Claims, 7 Drawing Sheets (51) Int. Cl.
*G10L 15/07* (2013.01)
*G10L 15/08* (2006.01)
*G10L 17/00* (2013.01)
*H04N 21/233* (2011.01)
*H04N 21/234* (2011.01)
*H04N 21/2343* (2011.01)
*H04N 21/81* (2011.01)

(52) U.S. Cl.
CPC ....... *G10L 15/083* (2013.01); *H04N 21/2335* (2013.01); *H04N 21/23418* (2013.01); *H04N 21/234345* (2013.01); *H04N 21/8106* (2013.01)

(56) References Cited

U.S. PATENT DOCUMENTS

| | | | |
|---|---|---|---|
| 2002/0087569 A1* | 7/2002 | Fischer | H04N 21/435 |
| 2007/0213987 A1* | 9/2007 | Turk | G10L 13/033 |
| | | | 704/E13.004 |
| 2018/0301170 A1* | 10/2018 | Rezanezhad Gatabi | |
| | | | G11B 27/11 |
| 2019/0057533 A1* | 2/2019 | Habra | G06T 13/205 |

* cited by examiner

METHOD AND SYSTEM FOR CONTENT INTERNATIONALIZATION AND LOCALIZATION

BACKGROUND OF THE INVENTION

Field of the Invention

The present disclosure relates to the analysis and manipulation of multimedia files, and more particularly but not exclusively to the creation of localized versions of video and audio files where the video frames are manipulated so that the facial expressions of on screen actors are matched to the vocal audio track, which may either be a dubbed audio track in the target language, or a vocal audio track that is created in the target language using the actor's voice pattern.

Description of the Related Art

In today's complex media supply chains, a movie or a single episode of a TV series or a film may have multiple variations or versions, often based on where the content is being consumed. For example, there can be one version for theatrical release, one for network broadcast, one for domestic syndication, one for DVD, one for online, and the list goes on.

Further complicating the issue, if a multimedia title is to be distributed internationally, there can be multiple versions for different markets, such as one in French, another in Japanese, German, etc. To mitigate the complexity of international distribution, oftentimes one international version of the video is produced that is sent to all international partners, which would then apply localization work onto the video prior to further distribution into their local markets.

At the minimum, the closed captioning text is translated, as well as any subtitle texts that may appear within the video. A creative decision then determines any further level of localization work to be applied, and this is done per localization version. Namely, the lightest level is to simply display the translated closed captioning text as subtitles, producing a foreign language film-like experience.

A next level deeper is to produce new audio tracks of the dialogs, such that the audience need not read subtitles while watching the video. This requires hiring voice actors to speak the translated dialog lines while watching the video, at the same time preserving as much emotional expressions and timing as possible. This requires much more effort and higher cost to produce, but also provides a better consumption experience.

However, oftentimes the translated dialogs do not fully preserve the creative intent of the original video, thus diluting the full effect of the storytelling. The impact of this again is a creative judgement call, and on a per localization basis, since it factors into differences in speech timing, idiomatic usages, cultural sensitivity, and others. In such scenarios, the original script, or sections of it, may be re-written and video re-edited to further refine the localization of the video to a particular market. Needless to say, this level of localization takes a great amount of effort and associated costs.

All of these current localization workflows are entirely manual, requiring teams of individuals to translate, dub, synchronize, inspect, and refine the localized version, while carefully preserving the creative intent of the original creators. Often times it takes multiple iterations of correction and refinement before the release into a local market, creating delays and complexities at considerable costs.

A need, therefore, exists for a method and system that is able to generate, align, and verify localized versions of videos given the original source video, in a semi-automated or fully-automated manner, in order to reduce the effort and costs in localizing videos for international distribution.

SUMMARY OF THE INVENTION

There may be provided a method of processing a video file and a plurality of translated version of the dialog text and dubbed audio spoken by voice actors, the method comprising: decoding images, audio, and closed captions if available from input video; detecting faces and facial landmarks from video images; performing speaker identification from a plurality of speech audio and face images; training a facial model based on face images and speech audio per identified speaker within input video; training a speech model based on speech audio and dialog text from closed captions or speech-to-text conversion per identified speaker within input video; generating one or more of the options of new speech audio from translated dialog text via speech model, new speech audio from dubbed audio input via speech model, new facial images from dubbed audio input via on facial model, or new facial images from dubbed audio input via facial model and new speech audio from translated dialog text via speech model; superimposing new facial images and splicing in new speech audio onto original video in order to generate localized version of the video.

There may be provided a method for analyzing an input video, containing the actors appearing within the image component of the videos, and the associated audio tracks of the dialogues spoken by the actors in their original language, to derive a training data of each actor's faces when speaking in their native language. Two models are then trained using machine learning algorithms to predict two input to output pairs.

First, the speech samples per actor is paired with the corresponding text, optionally represented as phonemes, to train a voice model per actor, in order for the model to generate new speech samples given new textual inputs. This voice model would allow for new speech audio to be generated automatically to sound like the original actor, but automatically.

Second, the speech samples per actor is paired with when the actor appears within the video, to train a machine learning model as to the actor's facial appearances when uttering different speech patterns. As part of this training, the objective of the model is to generate, with least amount of discrepancy, the facial appearances of that actor uttering the input speech patterns. Once trained, this facial model would enable new facial appearances of that actor to be generated, given new speech audio as input. In doing so, new footage of an actor speaking new dialogues can be generated automatically.

Note that this process is a sanctioned production workflow, in that new audio and video footage are generated in accordance to the review and approval of the actors. That is, these models that generate new voice samples and facial images are done in cooperation with the actor to minimize unnecessary labour and cost in localizing videos, not to generate unauthorized derivatives, or "fakes."

With these two trained models, they are used to re-voice an actor in a new localization language automatically. There may be three creative options or combinations a localization team can choose from, depending which preserves the most of the creative intent of the original.

A first option is the most lightweight, using the trained audio model to generate new speech in the localized language, given the translated dialogs as the input (e.g. German speech from German script). This would preserve the speaker identity of the original actor, as if he or she learned to speak the localized language. This new audio track would then be used instead of the one produced by hiring voice actors, saving the associated costs, as well as preserving the voice identity of the actor for that local audience. However, this method would not address the discrepancy between the speech with the actor's appearance on screen.

A second option is to hire a voice actor to record the localized audio track, to ensure the speech is as fluid and emotionally expressive as possible. This audio track is then fed into the trained facial appearance model of the original actor, to generate the facial images that most closely resembles the audio input. These new facial images are then superimposed onto the original video to fix the unsynchronized issue created by the dubbed audio tracks, while preserving more of the creative intent by the interpretive efforts of the voice actor. However, the original actor would lose his or her voice identity in the process to the voice actor, as is the case today.

A third option is to combine the first and second options, by having the voice model generate the localized audio, as well as using the visual appearance model to synchronize the facial movements. However, instead of using the translated text as input, the speech from a voice actor speaking in the localized language is also provided as the reference speech for which the original actor's speech is apply onto. In doing so, the voice model can transpose the original actor's voice onto the voice actor's, producing the most fluid and expressive speech in the localized language. In choosing this option, the creative expression is best conveyed, the speech identity is preserved, as well as the visual synchronization between the speech and the video is maintained.

With the described method, videos in their original language can be localized to any number of additional languages with a selectable or tuneable level of consumption experience based on the level of automation chosen. As such, it affords the method of the present invention to be applied incrementally, starting with the automated version with the lowest cost, and incrementally apply human translation and voice actors if the budget allows or better experience is deemed desirable. As additional human inputs are supplied, the described method compounds the benefits by incorporating more nuances and expressiveness to provide the best localized experience, while not requiring the original actors to perform any additional work.

There may be provided a method of generating a model for use in processing a video file to generate a version of the video file with translated audio content, the method comprising: identifying a specific speaker in the video file; obtaining speech samples of the identified specific speaker; converting each speech sample into a portion of text; and storing an association, for at least one speaker in the video file, of speech sample to text.

There may be provided a method of processing a video file to generate a modified video file, the modified video file including a modified audio content of the video file, the method comprising: processing the received video file in dependence on a model created according to the technique defined in the preceding paragraph.

There may be provided a method of generating a model for use in processing a video file to generate a version of the video file with translated audio content, the method comprising: identifying a specific speaker in the video file; determining an appearance of the specific speaker in video file; obtaining speech samples of the identified speaker; and storing an association, for at least one speaker in the video file, of the speaker appearance for each speech sample of the speaker.

A method of processing a video file to generate a modified video file, the modified video file including a modified audio content of the video file, the method comprising: processing the received video file in dependence on a model created according to the technique defined in the preceding paragraph.

The step of determining an appearance of a specific speaker may comprise capturing a facial expression of the speaker.

There may be provided a method of processing a video file to generate a modified video file, the modified video file including a translated audio content of the video file, the method comprising: receiving the video file; accessing a facial model or a speech model for a specific speaker, wherein the facial model maps speech to facial expressions, and the speech model maps text to speech; receiving a reference content for the originating video file for the specific speaker; generating modified audio content for the specific speaker and/or modified facial expression for the specific speaker; and modifying the video file in accordance with the modified content and/or the modified expression to generate the modified video file.

There may be provided a method of processing a video file to generate a modified video file, the modified video file including a translation of audio content of the video file, the method comprising: receiving the video file for processing; receiving a translated dialogues in text format of the video file for a speaker in the video file; accessing a model associating speech of said speaker with portions of text; and replacing audio content in the video file with translated dialog in accordance with the received model.

There may be provided a method of processing a video file to generate a modified video file, the modified video file including a translated audio content of the video file, the method comprising: receiving the video file for processing; receiving a translated dialogues in text format of the video file for a speaker in the video file; receiving a model associating speech of the speaker in the video file with portions of text; replacing audio content in the video file with generated speech in accordance with the received model; accessing a model associating facial characteristics of the speaker in the video file with portions of speech for those portions of replaced audio content; and replacing facial characteristics of the speaker in the video file in accordance with the received model.

There may be provided a method of processing a video file to generate a modified video file, the modified video file including a translated audio content of the video file, the method comprising: receiving the video file for processing; receiving a dubbed speech file for a speaker in the video file spoken by a voice actor; receiving a video file of a different speaker than the speaker in the video file, wherein the video is a video of the voice actor stating speech expressions; accessing a model associating facial characteristics of the speaker in the video file with portions of speech for those portions of replaced audio content; and replacing facial expressions of the speaker in the video file with facial expressions according to the video of the different speaker, on determination of a facial expression of the speaker matching a facial expression in the model.

There may be provided a method of processing a video file to generate a modified video file, the modified video file including a translated audio content of the video file, the method comprising: receiving the video file for processing; receiving a dubbed speech file for a speaker in the video file spoken by a voice speaker; receiving a video file of a different speaker than the speaker in the video file, wherein the video is a video of the voice actor stating speech expressions; accessing a model associating facial characteristics of the speaker in the video file with portions of speech for those portions of replaced audio content; replacing facial expressions of the speaker in the video file with facial expressions according to the video of the different speaker, on determination of a facial expression of the speaker matching a facial expression in the model; receiving a translated dialogue in text format of the audio in the video file for a speaker in the video file; receiving a model associating speech of the speaker in the video file with portions of text; replacing audio content in the video file with translated dialog in accordance with the received model; receiving a model associating facial characteristics of the speaker in the video file with portions of speech for those portions of replaced audio content; and replacing facial characteristics of the speaker in the video file in accordance with the received model.

The term "translated dialogues" refers to translated text from the original script to the localized language, i.e. not the speech. For the latter the process involves a voice actor speaking the translated text, for which the term "dubbed speech" is used herein. "Translated dialogues" can be referred to as "translated dialogues in text form", to avoid any confusion. These dialogue texts may either be spoken by the voice actors or be fed into the text-to-speech model (model #1) to automatically generate new speech in the target/localization language.

A key benefit of the inventive techniques is the flexibility in letting the customer choose, for a given title/episode, which level of localization they want to invest on a per language basis, e.g.:

|  | Translated subtitles to speech in original actor's voice | Dubbed audio via voice actors (external to our patent) | Transpose voice actor's speech to original actor's voice | Voice actor's speech and original actors' face synced | Original actor's voice + original actor's face synced |
|---|---|---|---|---|---|
| Spanish | ✓ | ✓ | ✓ | ✓ |  |
| German | ✓ | ✓ |  |  |  |
| Japanese | ✓ |  |  |  |  |
| Chinese | ✓ | ✓ | ✓ | ✓ | ✓ |
| Etc . . . |  |  |  |  |  |

As more features are enabled per language, the consumption experience improves but the cost increases also. As such, the invention provides flexibility, for example for the media companies, to pick and choose the level of localization based on the return on investment for a given target market.

BRIEF DESCRIPTION OF THE FIGURES

The invention is now described by way of example with reference to the accompanying Figures, in which.

DESCRIPTION OF PREFERRED EMBODIMENTS

The invention and embodiments of the invention are now described with reference to the accompanying Figures, which set out illustrative examples.

Figure 1:
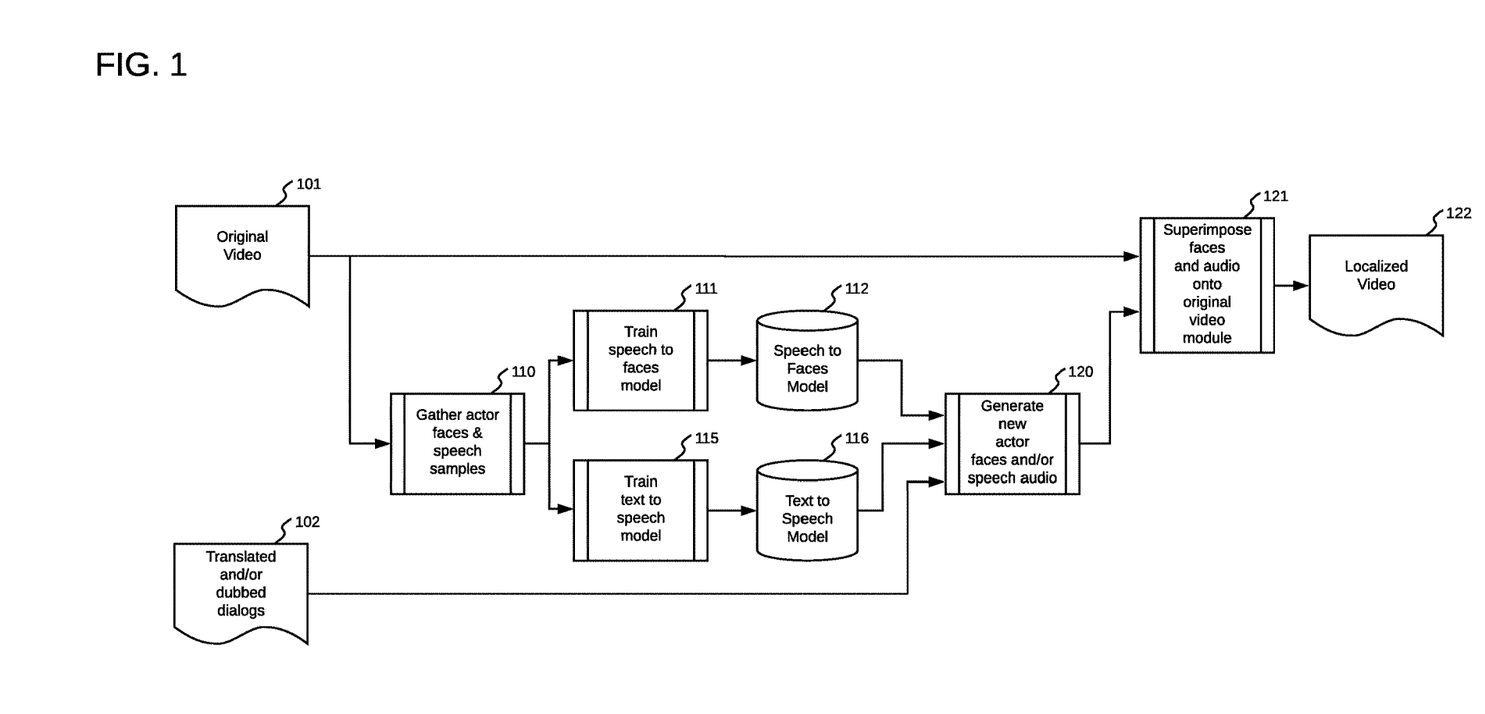
FIG. 1 illustrates an example of a system in which described examples may be implemented.

Reference can be made to FIG. 1.

As illustrated by reference numeral 101, a video is received which contains the actors appearing within the image component of the videos, and the associated audio tracks of the dialogues spoken by the actors in their original language.

Actor faces and speech samples are gathered to derive a training dataset of each actor's face when speaking in their native language, as illustrated by reference numeral 110.

Two models are then trained using machine learning algorithms to predict two input-to-output pairs.

The first model, model #1, is a model of text-to-speech. The training to create this model is denoted by reference numeral 115 in FIG. 1.

The speech samples per actor are paired with the corresponding text, represented using phonemes, to train a voice model per actor, in order for the model to generate new speech samples given new textual inputs.

This voice model would allow for new speech audio to be generated automatically to sound like the original actor.

An example of what the created first model may be is illustrated by Table 1.

TABLE 1

| ACTOR | SPEECH SAMPLE | TEXT |
|---|---|---|
| Actor #1 | Speech Sample #1 | Text |
|  | Speech Sample #2 | Text |
|  | Speech Sample #n | Text |
| Actor #2 | Speech Sample #1 | Text |
|  | Speech Sample #n | Text |

This first model, model #1, is illustrated in block 116 in FIG. 1.

The second model, model #2, is a model of speech-to-faces. The training to create this model is denoted by reference numeral 111 in FIG. 1.

The speech samples per actor are paired with when the actor appears within the video, to train a machine learning model as to the actor's facial appearances when uttering different speech patterns.

As part of this training, the objective of the model is to generate, with least amount of discrepancy, the facial appearances of that actor uttering the input speech patterns.

Once trained, this facial model would enable new facial appearances of that actor to be generated, given new speech audio as input. In doing so, new footage of an actor speaking new dialogue can be generated automatically.

An example of what the created first model may be is illustrated by Table 2.

TABLE 2

| ACTOR | SPEECH SAMPLE | FACIAL APPEARANCE |
| --- | --- | --- |
| Actor #1 | Speech Sample #1 | Actor #1 Facial Appearance #1 |
|  | Speech Sample #2 | Actor #1 Facial Appearance #2 |
|  | Speech Sample #n | Actor #1 Facial Appearance #n |
| Actor #2 | Speech Sample #1 | Actor #2 Facial Appearance #1 |
|  | Speech Sample #n | Actor #2 Facial Appearance #n |

This second model, model #2, is illustrated in block 112 in FIG. 1.

After the first and second models, model #1 and model #2, are created, either or both models may be used for further processing.

Before further describing FIG. 1, the creation of the first and second models will be described in more detail with reference to FIGS. 2 and 3.

Figure 2:
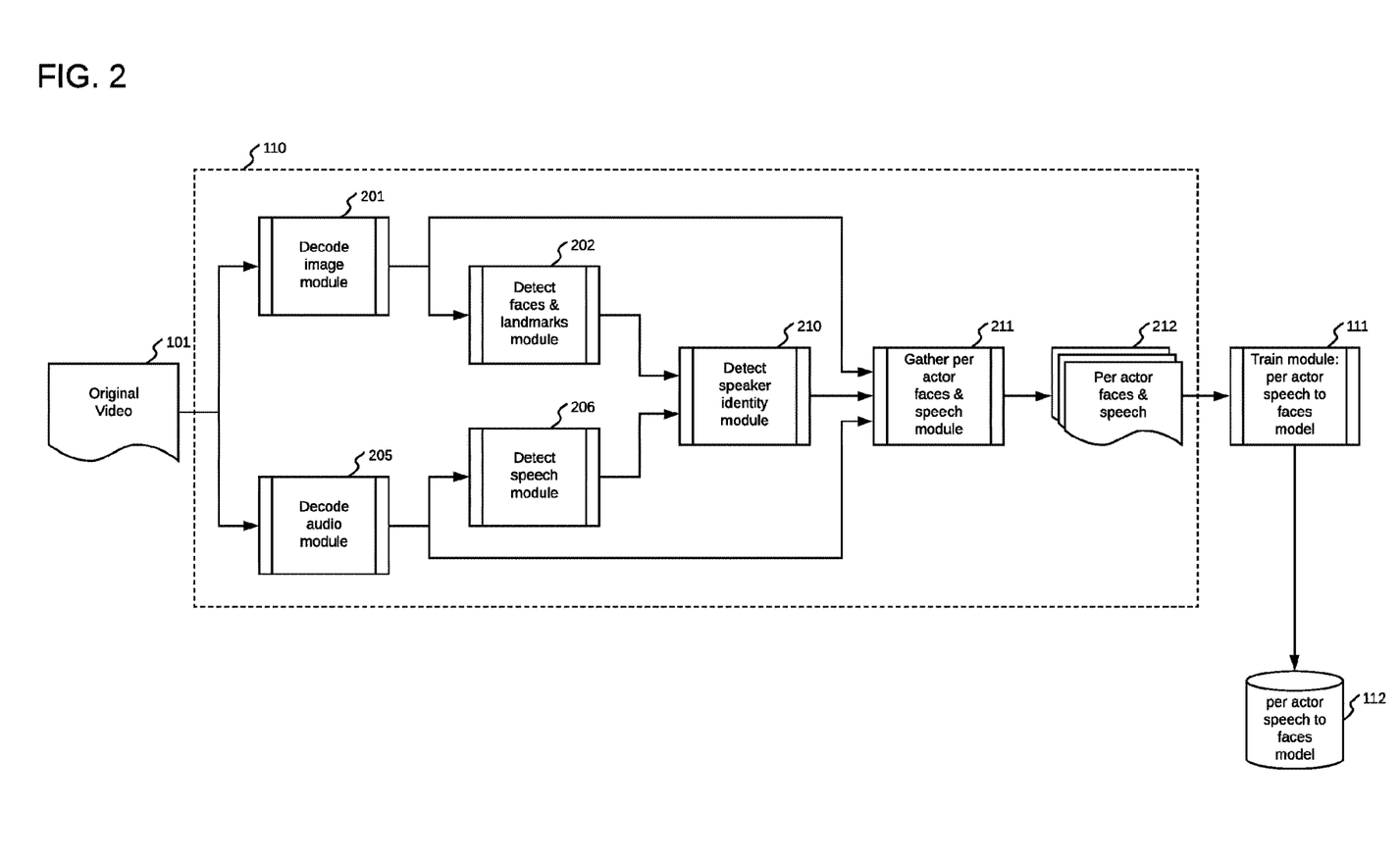
FIG. 2 illustrates an example implementation of a process for gathering faces and speech samples per actor from videos.

FIG. 2 details an exemplary process for creating the second model, model #2. This is the speech-to-faces model stored in model 112 of FIG. 1.

As illustrated in FIG. 2, the original video 101 (as in FIG. 1) is provided as an input to the block 110. In FIG. 2, the exemplary elements of block 110 for producing the speech-to-faces model 112 are illustrated.

The input video 101 is delivered to a decoded image module as illustrated by reference numeral 201 and a decode audio module as illustrated by reference numeral 205. These modules respectively provide a decoded image and a decoded audio from the input video and are familiar to those in the art.

The decoded image from module 201 is provided to a detect faces and landmarks module 202 and is familiar to those in the art.

The decoded audio from module 205 is provided to a detect speech module 206 and is familiar to those in the art.

A detect speaker identity module 210 receives the outputs of modules 202 and 206, and is able to retrieve and note the identity of an actor for which the faces and speech is being detected. This process is sometimes referred to as speaker diarization and is familiar to those in the art.

A gather-per-actor faces and speech module 211 receives the outputs of the modules 210, 201 and 205. The output from module 210 will be the actor identity, as well as the detected faces (and landmarks) and detected speech. The module 211 thus gathers all the data so far produced in module 110.

The gather-per-actor faces and speech module 211 generates an output to a per-actor faces and speech module 212. This module sorts the detected faces and speech to order them for each identified actor. This module then provides an output to the module 111 of FIG. 1.

The first model is then created, as per FIG. 1, and denoted by model 112. As above, the model 112 has modelled information consistent with Table 2.

Figure 3:
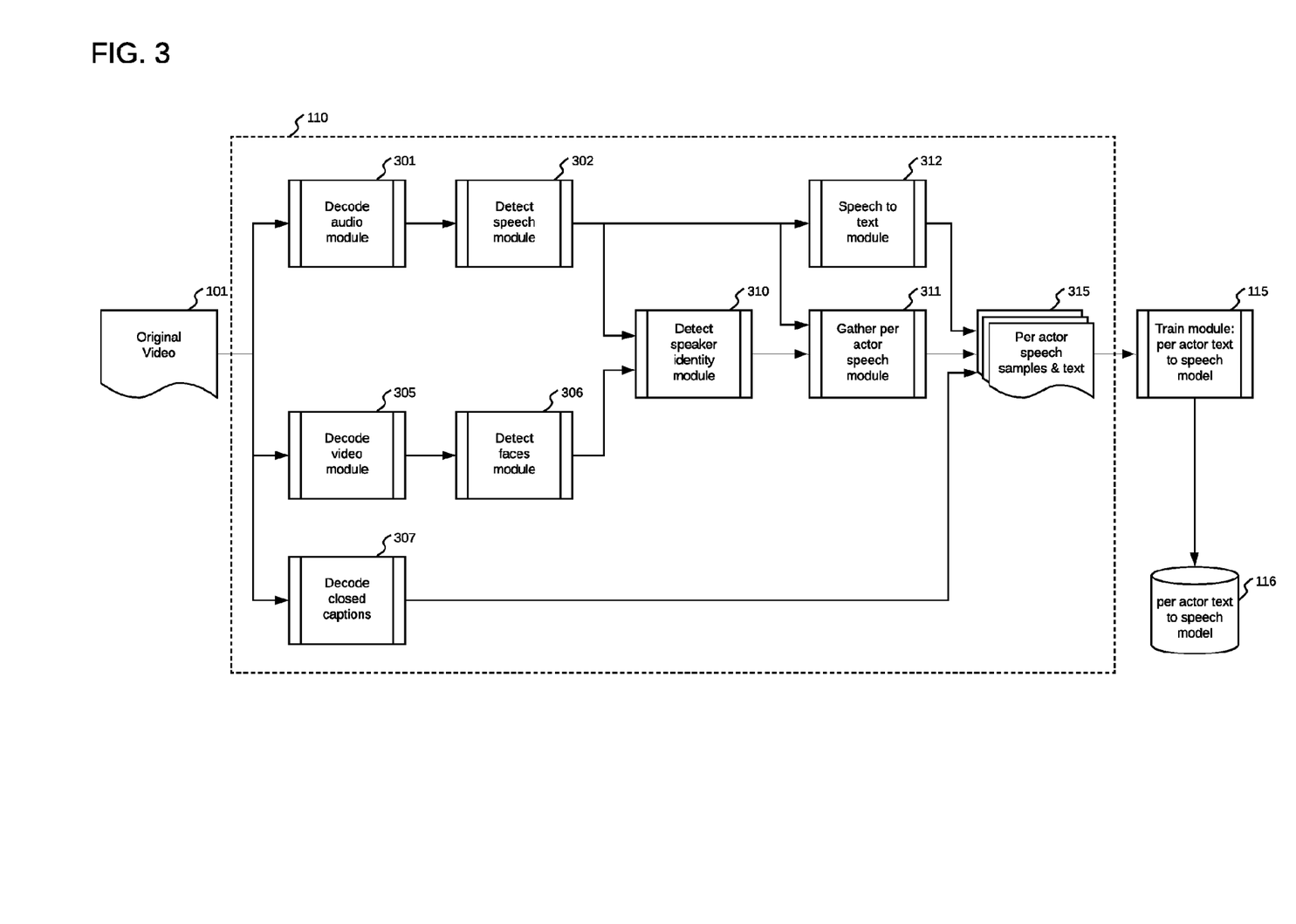
FIG. 3 illustrates an example implementation of a process for gathering speech samples and corresponding dialog text per actor from videos.

FIG. 3 details an exemplary process for creating the first model, model #1. This is the text-to-speech model stored in model 116 of FIG. 1.

As illustrated in FIG. 3, the original video 101 (as in FIG. 1) is provided as an input to the block 110. In FIG. 3, the exemplary elements of block 110 for producing the text-to-speech model 116 are illustrated.

The input video 101 is delivered to a decode audio module as illustrated by reference numeral 301, a decode video module as illustrated by reference numeral 305, and a decode closed captions module as illustrated by reference numeral 307. These modules respectively provide a decoded audio, decoded image, and decode closed captions from the input video and are familiar to those in the art.

The output from the decode audio module 301 is provided to a detect speech module 302, and the output from the decode video module 305 is provided to a detect faces module 306. These are standard modules and are familiar to those in the art.

A detect speaker identity module 310 receives the outputs of modules 302 and 306, so that the identity of the speaker (actor) associated with the speech can be identified. For the purpose of FIG. 3, and identifying speech/text, the provision of the face detection in module 306 is to assist in module 310 with identifying the speaker. This additional input is useful for scenarios where the speakers may be different than those appearing on-screen.

A speech-to-text module 312 converts the output of the module 302 into text and is familiar to those in the art.

A gather-per-actor speech module 311 collates the detected speech and speaker (actor) identity information.

A per-actor speech samples and text module 315 receives the outputs of module 312, 311 and 307. This module then provides an output to the module 115 of FIG. 1.

The first model is then created, as per FIG. 1, and denoted by model 116. As above, the model 116 has modelled information consistent with Table 1.

FIGS. 4 to 7 illustrate exemplary uses of the first and/or second models, the exemplary creation of which has been described in FIGS. 2 and 3. It should be noted that no exemplary use is limited to the specific technique for generating either the first or second model as described with reference to FIGS. 1 to 3.

Before describing each of the exemplary uses in FIGS. 4 to 7, reference can be made to the general overall use of the models in FIG. 1.

As illustrated by reference numeral 102 in FIG. 1, a file comprising a translated and/or dubbed version of the dialogue in the original video 101 is provided, for use in embodiments with the created models. As will become apparent from the description of FIGS. 4 to 7, reference to translated and/or dubbed dialogs is illustrative, and this input may comprise any one or more of: a translated dialogue (per actor or speaker); a dubbed dialogue/speech (per actor or speaker); video of the face of a voice actor. In general, this may be referred to as reference content.

This translated and/or dubbed version of the dialogue in the original video—or reference content—is provided as an input to a generate new actor faces and/or speech audio module 120, which additionally receives the models 112 and/or 116.

In embodiments, this module 120 uses either the first model 116, the second model 112, or model 116 first followed by model 112.

In embodiments, this module 120 may use the translated and/or dubbed dialogues—or more generally the reference content.

The operation of the module 120 will be described in embodiments with reference to FIGS. 4 to 7.

A superimpose faces and audio onto original video module 121 is provided, in embodiments, for further processing. The module 121 receives the original video 101, and the output of the module 120. The specific operation of this module 121 in embodiments is described with reference to FIGS. 4 to 7. Its operation will differ according to the embodiments. It may superimpose video and/or audio, and/or splice video and/or audio, onto the original video.

Reference numeral 121 denotes the localised video, denoted which is the output of the process from module 121.

Figure 4:
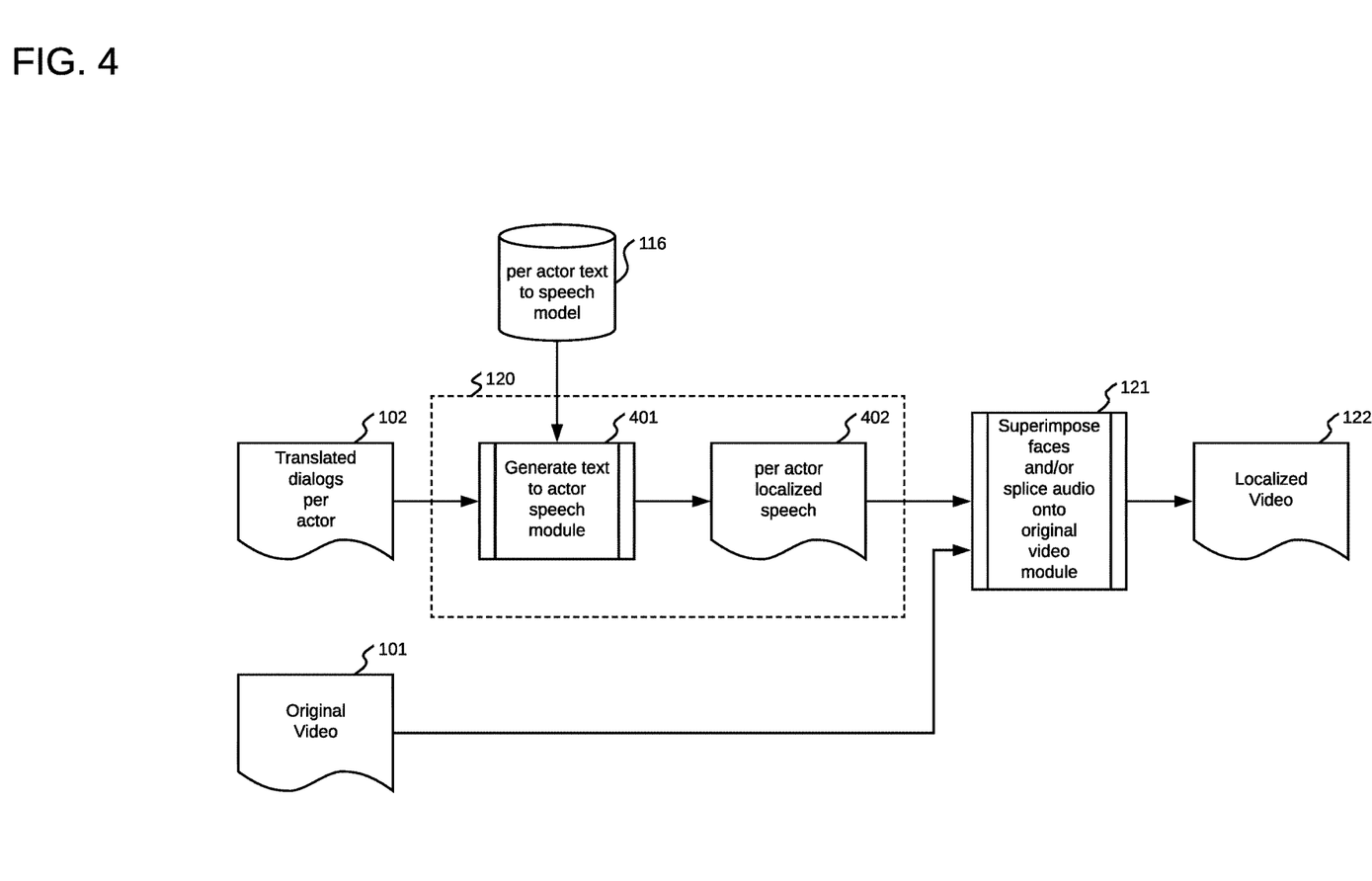
FIG. 4 illustrates an example implementation of a process for generating localized speech per actor from translated dialogs to generate localized videos.

With reference to FIG. 4, a first example use is described. This example uses only the first model 116.

Further detail of module 120 is shown in FIG. 4, which illustrated elements of the module 120 which are used in the exemplary process of FIG. 4. The generate new actor faces and/or speech audio module 120 comprises, in this example, a generate text-to-actor speech module, and per actor localised speech module.

The original video as denoted by reference numeral 101 is provided, and in this example the translated dialogues in textual format per actor is provided as denoted by reference numeral 102. This is, more generally, a subset of the reference content.

The translated dialogues in textual format per actor as denoted by reference numeral 102, and the first model 116, are provided as inputs to the generate text-to-actor speech module 401. The output of the module 401 is provided to the module 402.

The superimpose faces and audio onto original video module 121 of FIG. 1 is provided to receive the output of module 402 (and the thus the output of module 120), and the original video 101.

As with FIG. 1, the superimpose faces and/or splice audio onto original video module 121 splices the audio to provide the localised video 122.

The example use of FIG. 4 is the most lightweight option described, using only the trained text-to-speech model (model #1) to generate new speech in the localized language, given the translated dialogs in textual format as the input.

This example preserves the speaker identity of the original actor, as if he or she learned to speak the localized language. This new audio track would then be used instead of one produced by hiring voice actors. This saves the associated costs, as well as preserving the voice identity of the actor for that local audience. However, this method may not address the discrepancy between the speech with the actor's appearance on screen.

In this example use, the translated dialogue in textual format per actor provided as an input to module 401, is translated dialogue provided as part of the reference material. This translated dialogue may be converted into speech samples in the translated dialogue, using the text-to-speech model 116 that captures the speaker identity of the original actor. In doing so, the actor's original speech track may be replaced with the actor's voice track in the translated language.

Module 121 then superimposes that audio track onto the original video, with the original audio being replaced.

Reference can be made to Table 3.

TABLE 3

| ACTOR | SPEECH SAMPLE (TARGET LANGUAGE) | TEXT (TARGET LANGUAGE) | TEXT (ORIGINAL LANGUAGE) |
|---|---|---|---|
| Actor #1 | Speech Sample (Target) #1 | Text (Target) #1 | Text (Original) #1 |
| Actor #2 | Speech Sample (Target) #2 | Text (Target) #2 | Text (Original) #2 |
| Actor #n | Speech Sample (Target) #n | Text (Target) #n | Text (Original) #n |

Figure 5:
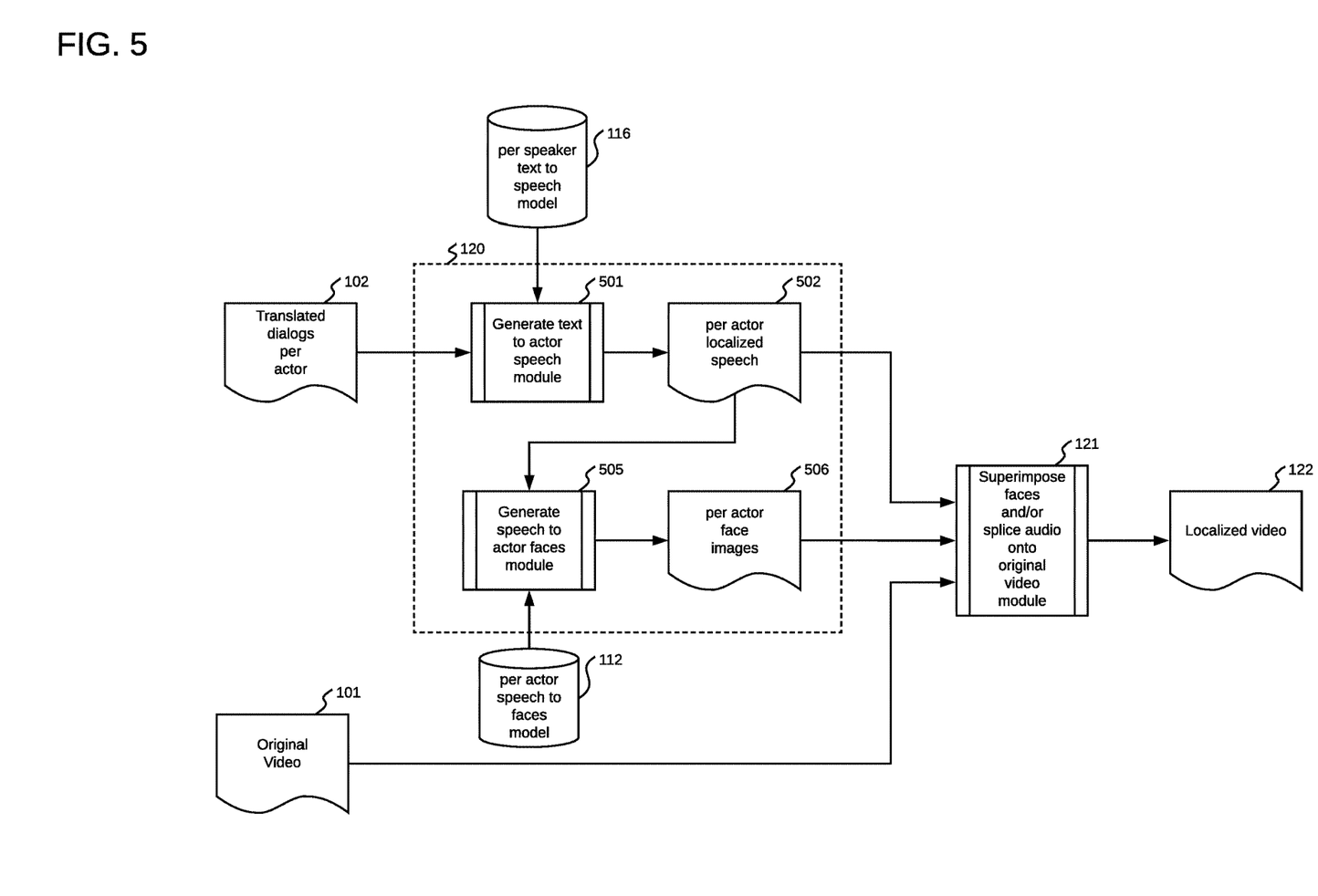
FIG. 5 illustrates an example implementation of a process for generated localized speech and visually matching faces per actor from translated dialogs to generate localized videos.

With reference to FIG. 5, a second example use is described. This example uses both the first model 116 and the second model 112.

The generate new actor faces and/or speech audio module 120 of FIG. 1 includes, in this example, a generate text-to-actor speech module 501 and a generate speech-to-actor faces module 505.

The generate text-to-actor speech module 501 receives the translated dialogs in textual format per actor 102 (which in general is a subset of the reference content) and the text-to-speech model 116, i.e., model #1. The output of this module is localized speech per actor 502.

The module 502 provides its output to the module 505, which additionally receives the speech-to-faces model 112, i.e. the second model. The output of module 505 is face images per actor 506.

The superimpose faces and audio onto original video module 121 of FIG. 1 is provided to receive the output of module 120, which in this example is the outputs from the modules 502 and 506. The superimpose faces and audio onto original video module 121 further receives the original video 101.

As with FIG. 1, the superimpose faces and/or splice audio onto original video module 121 provides the localised video 122.

In the example use of FIG. 5, modules 501 and 502 perform a similar function to modules 401 and 402 of FIG. 4, to generate an output at module 502 similar to the output at module 402.

In addition, this speech output is provided to module 505, so that the face images of the actor when speaking the audio can be generated by module 505.

This example use is thus to combine the first and second options, by having the voice model generate the localized audio, as well as using the visual appearance model to synchronize the facial movements.

Figure 6:
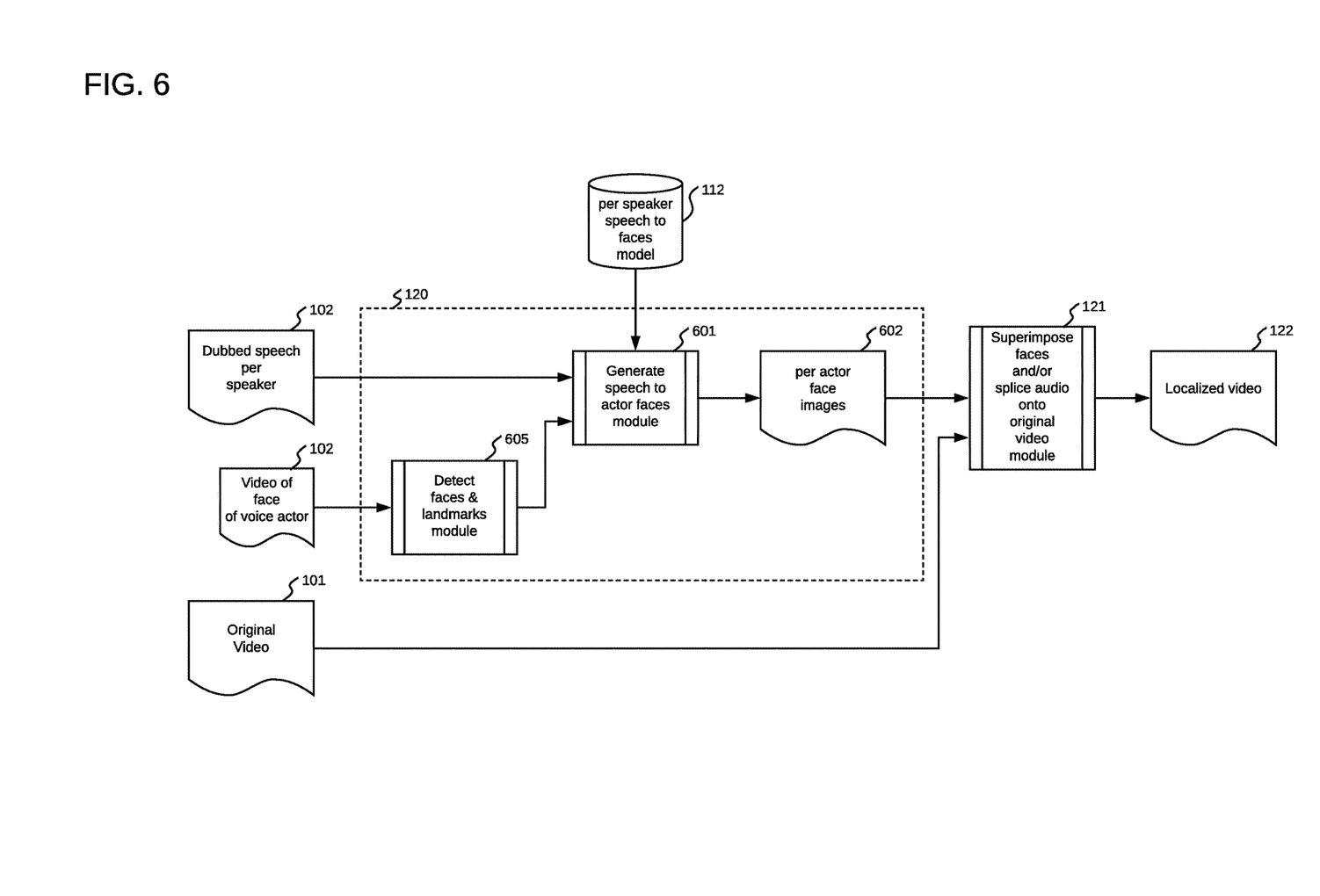
FIG. 6 illustrates an example implementation of a process for generating visually matching faces per actor based on dubbed audio to generate localized videos.

With reference to FIG. 6, a third example use is described. This example uses only the second model 112.

The generate new actor faces and/or speech audio module 120 of FIG. 1 includes, in this example, a detect faces and landmarks module 605, and a generate speech-to-actor faces module 601.

The generate speech-to-actor faces module 601 receives the dubbed speech per speaker/actor as illustrated by reference numeral 102 (this is in general a subset of the reference content 102 denoted in FIG. 1 and the speech-to-faces model 112, i.e. the second model, to generate the output of face images per actor 602.

Optionally, the detect faces and landmarks module 605 receives the video of faces of the voice actors, as illustrated by reference numeral 102. The output of this module is provided to generate speech-to-actor faces module 601 to further improve the face images generation quality.

The face images per actor 602 forms the output of the generate new actor faces and/or speech audio module 120.

The superimpose faces and audio onto original video module 121 of FIG. 1 is provided to receive the output of module 120, which in this example is the output of module 602, and the original video 101.

As with FIG. 1, the superimpose faces and/or splice audio onto original video module 121 provides the localised video 122.

With the third example use, a voice model is generated of the localized audio, as well as using the visual appearance model to synchronize the facial movements.

The third example use is to hire voice actors to record the localized audio track, to ensure the speech is as fluid and emotionally expressive as possible.

This audio track is then fed into the trained facial appearance model of the original actors, to generate the facial images that most closely resembles the audio input.

These new facial images are then superimposed onto the original video to fix the unsynchronized issue created by the dubbed audio tracks, while preserving more of the creative intent by the interpretive efforts of the voice actor.

However, the original actor would lose his or her voice identity in the process to the voice actor, as is the case today.

Figure 7:
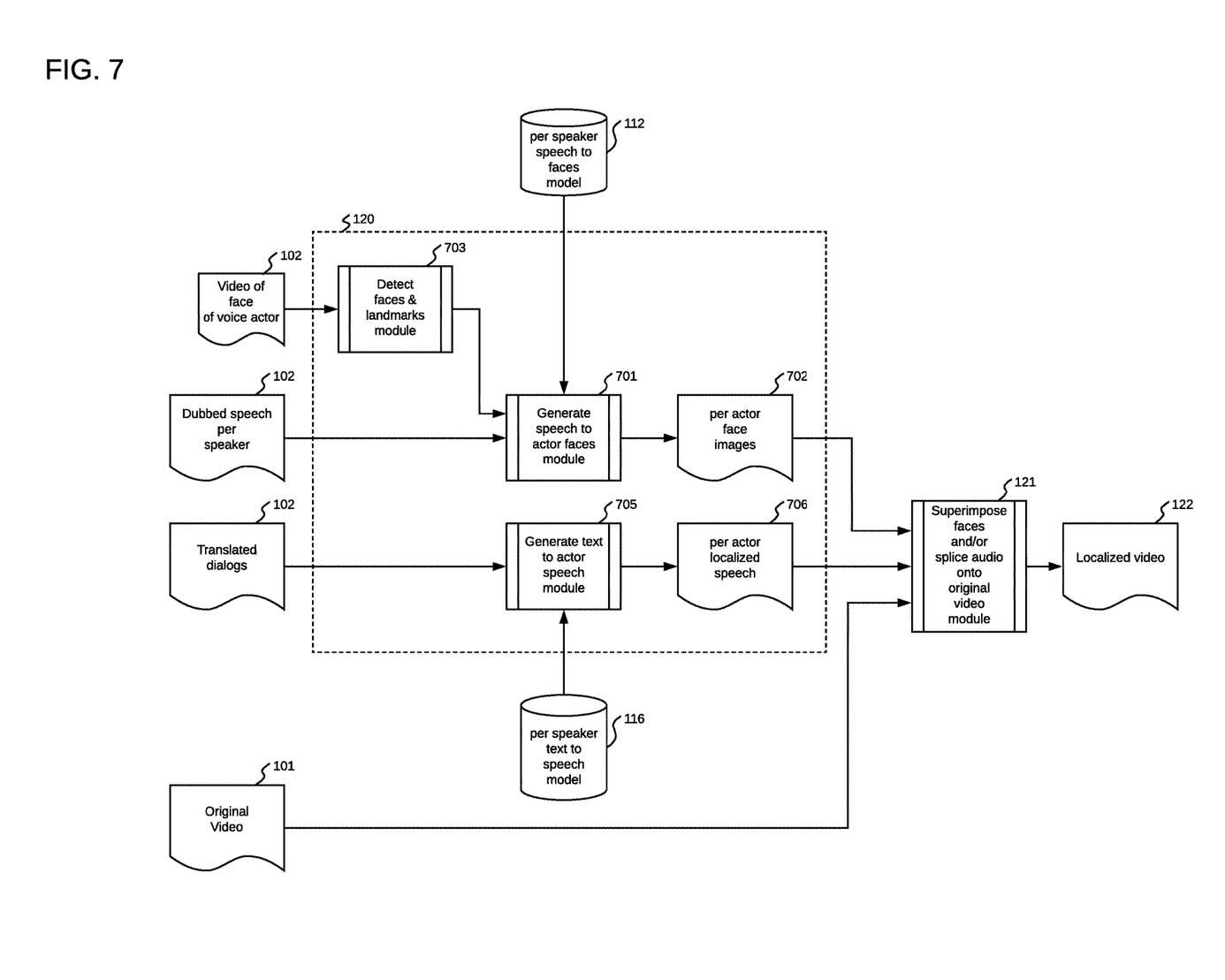
FIG. 7 illustrates an example implementation of a process for generating visually matching faces and localized speech per actor from dubbed audio to generate localized videos.

With reference to FIG. 7, a fourth example use is described. This example uses both the first model 116 and the second model 112.

The generate new actor faces and/or speech audio module 120 of FIG. 1 includes, in this example, a detect faces and landmarks module 703, a generate speech-to-actor faces module 701, and a generate text-to-actor speech module 705.

The generate speech-to-actor faces module 701 receives the dubbed speech per speaker/actor as illustrated by reference numeral 102 (this is in general a subset of the reference content 102 denoted in FIG. 1), and the speech-to-faces model 112, i.e. the second model. The output of the module is the per actor face images 702.

Optionally, the detect faces and landmarks module 703 receives the video of face of the voice actor, as illustrated by reference numeral 102. This is in a general a subset of the reference content 102 denoted in FIG. 1. The output of this module is provided to generate speech-to-actor faces module 701 to further improve the face images generation quality.

The generate text-to-actor speech module 705 receives the translated dialogs in textual format as illustrated by reference numeral 102 (this is in general a subset of the reference content 102 denoted in FIG. 1), and the text-to-speech model 116, i.e. the first model. The output of this module is the per actor localized speech samples 706.

The superimpose faces and audio onto original video module 121 of FIG. 1 is provided to receive the output of module 120, which in this example is the output of modules 702 and 706, and the original video 101.

As with FIG. 1, the superimpose faces and/or splice audio onto original video module 121 provides the localised video 122.

However, instead of using the translated dialogues in textual format as input, the speech from a voice actor speaking in the localized language is also provided as the reference speech, for which the original actor's speech is applied onto. In doing so, the voice model can transpose the original actor's voice onto the voice actor's, producing the most fluid and expressive speech in the localized language.

In choosing this option, the creative expression is best conveyed, the speech identity is preserved, as well as the visual synchronization between the speech and the video is maintained.

In implementations, the process may be implemented in real-time, for example where the implementation uses a remote server executing the instructions of the described method. An example (which is not limited to real-time) is as follows):
- a script of the video is translated into a target language;
- a voice actor for the actor in the video speaks the lines of the translatred script, with a camera recording the voice actor's facial expressions;
- the described facial model (the second model) generates the video actor's facial expressions to mimic the voice actor's facial expressions in real-time;
- a local director (a localisation director) watches the rendered video and changes the lines/re-voice the audio on-the-fly, to best preserve the creative intent, eliminating long round trip times.

There is described, in general, two approaches.

A first approach involves using a different actors voice in the audio dub and then manipulating the actors facial expressions, such as mouth position, to match the audio dub.

A second approach involves creating the audio dub using the actors voice in another language by machine learning, and then the facial expressions are manipulated to match the machine learning created audio dub.

Another example is as follows.

The content is distributed to a country (e.g. France), and a creative decision is made on localisation approaches, such as:
i. Subtitles only;
ii. Subtitles and Audio Description;
iii. Existing Audio dubbed in local language; or
iv. Script re-written to match local language/current facial expressions.

The facial expressions of the actors in the program may be matched to the audio dub.

The benefits provided are that the technique is automated, provides better quality, and better preservation of creative intent.

A local dubbing studio may be utilised in order to create new audio tracks, for each a localised audio track is created. It may be created using a dubbing actor who creates a localised version of the audio track for each actor/actress in the production. It may also be created using a machine learning approach that uses the original English speaking (for example) actor voice samples as an input in order to create a voice output in another language, but using the vocal style of the actor/actress. The new track may be synchronised to the source version.

For facial manipulation, actor's facial expressions are examined.

Voices many be digitally created. Machine learning algorithms can create a unique set of voices: both male and female; of different age groups; different accents; speaking in different languages.

Machine learning algorithms can create the necessary data in order to manipulate an actor/actresses facial features so that it looks as though they are speaking the vocal track—so that their mouth movements/facial expressions are in synchronisation with the localised audio track.

The process as described is preferably a sanctioned production workflow, in that new audio and video footage are generated in accordance to the review and approval of the actors. That is, these models that generate new voice samples and facial images are preferably performed in cooperation with the actor to minimize unnecessary labour and cost in localizing videos, whilst not generating unauthorized derivatives, or "fakes."

These two trained models may be used to re-voice an actor in a new localization language automatically.

Preferably there are four combinations a localization team can choose from, which vary in preserving the most creative intent of the original.

With the described processes, videos in their original language can be localized to any number of additional languages with a tuneable level of consumption experience based on the level of automation chosen. As such, it affords the method to be applied incrementally, starting with the automated version with the lowest cost, and incrementally apply human translation and voice actors if the budget allows or better experience is deemed desirable. As additional human inputs are supplied, the described method compounds the benefits by incorporating more nuances and expressiveness to provide the best localized experience, while not requiring the original actors to perform any additional work.

The described processes can be implemented as methods embodied in computer program code, which compute program code when executed on a computer performs any process a described.

The computer program code may be embodied on any computer storage medium.

The invention is not limited to any embodiments or examples as described, and different features of different embodiments are examples may be combined.

The invention claimed is:

1. A method of processing an original video file to generate a modified video file, the modified video file including a translated audio content of the original video file, the method comprising:
   receiving the original video file for processing;
   receiving a second video file of a different speaker than the speaker in the original video file, wherein the second video file is a video of a different speaker stating speech expressions;
   accessing a model associating facial characteristics of the speaker in the original video file with portions of speech for those portions of replaced audio content; and
   replacing facial expressions of the speaker in the original video file with facial expressions according to the video of the different speaker, on determination of a facial expression of the speaker matching a facial expression in the model.

2. The method of claim 1, further comprising generating a model for use in processing a video file to generate a version of the original video file with translated audio content, the method further comprising:
   identifying a specific speaker in the original video file;
   obtaining speech samples of the identified specific speaker;
   converting each speech sample into a portion of text; and
   storing an association, for at least one speaker in the original video file, of speech sample to text.

3. The method of claim 2 further comprising the step of training the model, via at least one machine learning algorithm, to associate at least one speaker's voice with each speech sample of the at least one speaker.

4. The method of claim 3 wherein each speech sample of the speaker is spoken text.

5. The method of claim 1, wherein the modified video file includes a modified audio content of the original video file, the method further comprising:
   processing the received video file in dependence on the model created according to the method of claim 1 for the at least one speaker.

6. The method of claim 1, further comprising generating the model for use in processing a video file to generate a version of the original video file with translated audio content, the method comprising:
   identifying a specific speaker in the original video file;
   determining an appearance of the specific speaker in the original video file;
   obtaining speech samples of the identified speaker; and
   storing an association, for at least one speaker in the original video file, of the speaker appearance for each speech sample of the at least one speaker.

7. The method of claim 6 further comprising the step of training the model, via at least one machine learning algorithm, to associate at least one speaker's appearance to each speech sample of the speaker.

8. The method according to claim 6 wherein the step of determining an appearance of the specific speaker comprises capturing a facial expression of the specific speaker.

9. The method of claim 1, wherein the modified video file includes a modified audio content of the video file, the method comprising:
   processing the received video file in dependence on the model created according to the method of claim 6.

10. The method of claim 1, the method further comprising:
    accessing a facial model for a specific speaker, wherein the facial model maps speech to facial expressions;
    receiving a reference content for the original video file for the specific speaker;
    generating modified facial expression for the specific speaker; and
    modifying the video file in accordance with the modified expression to generate the modified video file.

11. A method of claim 1, the method further comprising:
    receiving a translated dialogues in text format of the original video file for a speaker in the video file;
    accessing a model associating speech of the speaker with portions of text; and
    replacing audio content in the video file with generated speech or translated dialog in accordance with the received model.

12. The method of claim 1, the method further comprising:
    receiving a translated dialogues in text format of the original video file for a speaker in the original video file;
    receiving a model associating speech of the speaker in the original video file with portions of text;
    replacing audio content in the original video file with generated speech in accordance with the received model;
    accessing a model associating facial characteristics of the speaker in the original video file with portions of speech for those portions of replaced audio content; and
    replacing facial characteristics of the speaker in the original video file in accordance with the received model.

13. The method of claim 1 further comprising receiving a dubbed speech file for a speaker in the original video file spoken by a voice actor.

14. The method of claim 13 wherein the replaced audio content is of the voice actor.

15. The method of claim 1 wherein the replaced audio content is of a voice actor.

16. The method of claim 1, the method further comprising:

receiving a translated dialogue in text format of the audio in the original video file for the speaker in the video file;

receiving a model associating speech of the speaker in the original video file with portions of text;

replacing audio content in the original video file with translated dialog in accordance with the received model;

receiving the model associating facial characteristics of the speaker in the original video file with portions of speech for those portions of replaced audio content; and replacing facial characteristics of the speaker in the original video file in accordance with the received model.

17. The method of claim 16 further comprising the step of receiving a dubbed speech file for a speaker in the original video file spoken by a voice speaker.

18. The method of claim 1, further comprising:

accessing a speech model for a specific speaker, wherein the speech model maps text to speech;

receiving a reference content for the original video file for the specific speaker;

generating modified audio content for the specific speaker; and modifying the video file in accordance with the modified content and to generate the modified video file.

19. The method of claim 1 further comprising generating a model of facial characteristics of the different speaker stating speech expressions.

20. The method of claim 1 wherein the speech in the video file is translated and matched to speech in the model of the different speaker, wherein the facial characteristics associated with the different speaker for that speech is used to replace the facial expressions of the speaker in the original video file with a facial expression of that speaker which matches the facial expression of the different speaker.

* * * * *